(12) United States Patent
Bush et al.

(10) Patent No.: US 10,460,609 B2
(45) Date of Patent: Oct. 29, 2019

(54) APPARATUS FOR PLANNING AIR REFUELING FOR AIRCRAFT

(71) Applicant: The Boeing Company, Chicago, IL (US)

(72) Inventors: Larry Wayne Bush, Sherwood, OR (US); Sven David Aspen, Sherwood, OR (US); Luther Boorn, Sherwood, OR (US); Randall E. Thieme, Newberg, OR (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 15/256,702

(22) Filed: Sep. 5, 2016

(65) Prior Publication Data

US 2016/0371986 A1 Dec. 22, 2016

Related U.S. Application Data

(62) Division of application No. 11/833,009, filed on Aug. 2, 2007, now Pat. No. 9,437,113.
(Continued)

(51) Int. Cl.
*G08G 5/00* (2006.01)
*B64D 39/00* (2006.01)
(Continued)

(52) U.S. Cl.
CPC ........... *G08G 5/0034* (2013.01); *B64D 39/00* (2013.01); *G08G 5/0052* (2013.01);
(Continued)

(58) Field of Classification Search
CPC ...................................................... B64D 39/00
See application file for complete search history.

(56) References Cited

U.S. PATENT DOCUMENTS

| 7,272,491 B1 | 9/2007 | Berard |
| 9,437,113 B2 | 9/2016 | Bush et al. |
| (Continued) | | |

FOREIGN PATENT DOCUMENTS

WO WO0065373 A1 11/2000

OTHER PUBLICATIONS

International Search Report and Written Opinion, dated Oct. 22, 2008, regarding Application No. PCT/US2008/054975, 14 pages.
(Continued)

*Primary Examiner* — Imran K Mustafa
(74) *Attorney, Agent, or Firm* — Yee & Associates, P.C.

(57) ABSTRACT

A method, apparatus, and computer usable program code for planning refueling. In one advantageous embodiment, the apparatus includes an air refueling plug-in application capable of calculating air refueling routes for a formation of aircraft and a plurality of plug-in applications. A framework capable of providing framework services to the air refueling plug-in application and the plurality of plug-in applications is present. The apparatus also includes a first interface for the air refueling plug-in application and the plurality of plug-in applications to receive the framework services from the framework. The apparatus also has a second interface for the air refueling plug-in application and plurality of plug-in applications to provide services from one plug-in application to another plug-in application. The first interface and the second interface are independent of the air refueling plug-in application and plurality of plug-in applications.

10 Claims, 10 Drawing Sheets

Related U.S. Application Data

(60) Provisional application No. 60/922,278, filed on Apr. 4, 2007.

(51) Int. Cl.
*H04B 7/185* (2006.01)
*H04L 12/40* (2006.01)

(52) U.S. Cl.
CPC ....... *G08G 5/0091* (2013.01); *H04B 7/18506* (2013.01); *H04L 12/40* (2013.01)

(56) References Cited

U.S. PATENT DOCUMENTS

| | | | | |
|---|---|---|---|---|
| 2002/0011950 A1* | 1/2002 | Frazier | ............ | G01C 23/00 |
| | | | | 342/357.32 |
| 2002/0039072 A1* | 4/2002 | Gremmert | ............ | G01S 7/003 |
| | | | | 340/945 |
| 2002/0073101 A1* | 6/2002 | Stoyen | ............ | G09B 9/003 |
| 2004/0182966 A1* | 9/2004 | Schneider | ............ | B64D 39/00 |
| | | | | 244/13 |
| 2006/0000949 A1* | 1/2006 | Schroeder | ............ | B64D 39/00 |
| | | | | 244/135 A |
| 2008/0250423 A1 | 10/2008 | Bush et al. | | |
| 2008/0270331 A1* | 10/2008 | Taylor | ............ | G06N 3/126 |
| | | | | 706/13 |

OTHER PUBLICATIONS

Empson, "AIRPLAN—Air Refueling Planning—Air-to-Air Refuelling Planning & Tanker Fleet Optimization Software by AIRPLAN", AIRPLAN Mission Planning & Fleet Optimisation Software, Jun. 1, 2006, 43 pages. www.air-refueling.com.

Office Action, dated Mar. 12, 2010, regarding U.S. Appl. No. 11/833,009, 10 pages.

Final Office Action, dated Jul. 26, 2010, regarding U.S. Appl. No. 11/833,009, 12 pages.

Office Action, dated Apr. 1, 2011, regarding U.S. Appl. No. 11/833,009, 11 pages.

Final Office Action, dated Aug. 3, 2011, regarding U.S. Appl. No. 11/833,009, 15 pages.

Office Action, dated Jan. 20, 2012, regarding U.S. Appl. No. 11/833,009, 17 pages.

Office Action, dated Aug. 30, 2012, regarding U.S. Appl. No. 11/833,009, 17 pages.

Notice of Allowance, dated May 6, 2016, regarding U.S. Appl. No. 11/833,009, 6 pages.

* cited by examiner

APPARATUS FOR PLANNING AIR REFUELING FOR AIRCRAFT

This application is a divisional application of U.S. application Ser. No. 11/833,009, filed Aug. 2, 2007, which claims the benefit of the filing date of corresponding U.S. Provisional Patent Application No. 60/922,278, entitled "Advanced Arial Refueling Planning and On-Board Management Systems", filed Apr. 4, 2007, which is incorporated herein by reference.

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program code for planning air refueling for aircraft.

2. Background

Air refueling is a process of transferring fuel from one aircraft to another aircraft during flight. The aircraft providing the fuel is referred to as a tanker aircraft, while the aircraft receiving the fuel is referred to as a receiver aircraft. This air refueling process allows the receiver aircraft to remain airborne longer. In other words, the receiver aircraft may extend its range or radius of deployment. A series of air refuelings can increase the range almost indefinitely, with the range being limited by crew fatigue and engineering factors, such as engine oil consumption, cargo, or personnel. This balancing of the larger payload with less fuel maintains the maximum takeoff weight for an aircraft. Thus, refueling in the air, the receiver aircraft may extend its range and increase the payload that may be carried.

Typically, a tanker aircraft providing fuel is especially designed for the task. The tanker aircraft is typically provided with a boom or flexible hose, which trails behind the tanker aircraft. This boom or hose is used to make a physical connection with the receiver aircraft to be refueled.

Currently, fuel cost is becoming an important factor in air refueling. Minimizing the use of fuel by the receiver aircraft is desirable. Further, in some cases, the amount of fuel available for a receiver aircraft may be limited. For example, a limited number of tanker aircraft may be present to refuel one or more receiver aircraft. As a result, it is desirable to maximize the efficient use of fuel by the receiver aircraft. In other instances, limits to total fuel used by all aircraft, receiver aircraft, and tanker aircraft, may be desirable. Various factors, such as the speed of the aircraft, the time at which refueling occurs, and others are important for increasing fuel efficiency.

Therefore, it would be advantageous to have an improved method, apparatus, and computer usable program product for planning air refueling.

SUMMARY

The different advantageous embodiments provide a method, apparatus, and computer usable program code for planning refueling. In one advantageous embodiment, the apparatus includes an air refueling plug-in application capable of calculating air refueling routes for a formation of aircraft and a plurality of plug-in applications. A framework capable of providing framework services to the air refueling plug-in application and the plurality of plug-in applications is present. The apparatus also includes a first interface for the air refueling plug-in application and the plurality of plug-in applications to receive the framework services from the framework. The apparatus also has a second interface for the air refueling plug-in application and plurality of plug-in applications to provide services from one plug-in application to another plug-in application. The first interface and the second interface are independent of the air refueling plug-in application and plurality of plug-in applications.

In another advantageous embodiment, a method is present for planning air refueling. First data for a plurality of receiver aircraft is received to form received receiver data. Second data for a set of tanker aircraft is received to form received tanker data. A refueling plan for use between a starting point and a destination point for the plurality of receiver aircraft is generated using the received formation data and the received tanker data in which fuel efficiency is optimized for the plurality of the receiver aircraft and the set of tanker aircraft as a group.

A computer program product is present in another embodiment. The computer program product comprises a computer usable medium having computer usable program code for planning refueling. Computer usable program code is present for receiving first data for a plurality of receiver aircraft to form received receiver data. The computer usable program code includes computer usable program code for receiving second data for a set of tanker aircraft to form received tanker data. Computer usable program code is present for generating a refueling plan for use between a starting point and a destination point for the plurality of receiver aircraft using the received formation data and the received tanker data in which fuel efficiency is optimized for a set of aircraft as a group in the plurality of the receiver aircraft and the set of tanker aircraft.

In yet another advantageous embodiment, a data processing system comprises a bus, a communications unit connected to the bus, a storage device connected to the bus, wherein the storage device includes computer usable program code, and a processor unit connected to the bus. The processor unit executes the computer usable program to receive first data for a plurality of receiver aircraft to form received receiver data; receive second data for a set of tanker aircraft to form received tanker data; and generate a refueling plan for use between a starting point and a destination point for the plurality of receiver aircraft using the received formation data and the received tanker data in which fuel efficiency is optimized for a set of aircraft as a group in the plurality of the receiver aircraft and the set of tanker aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
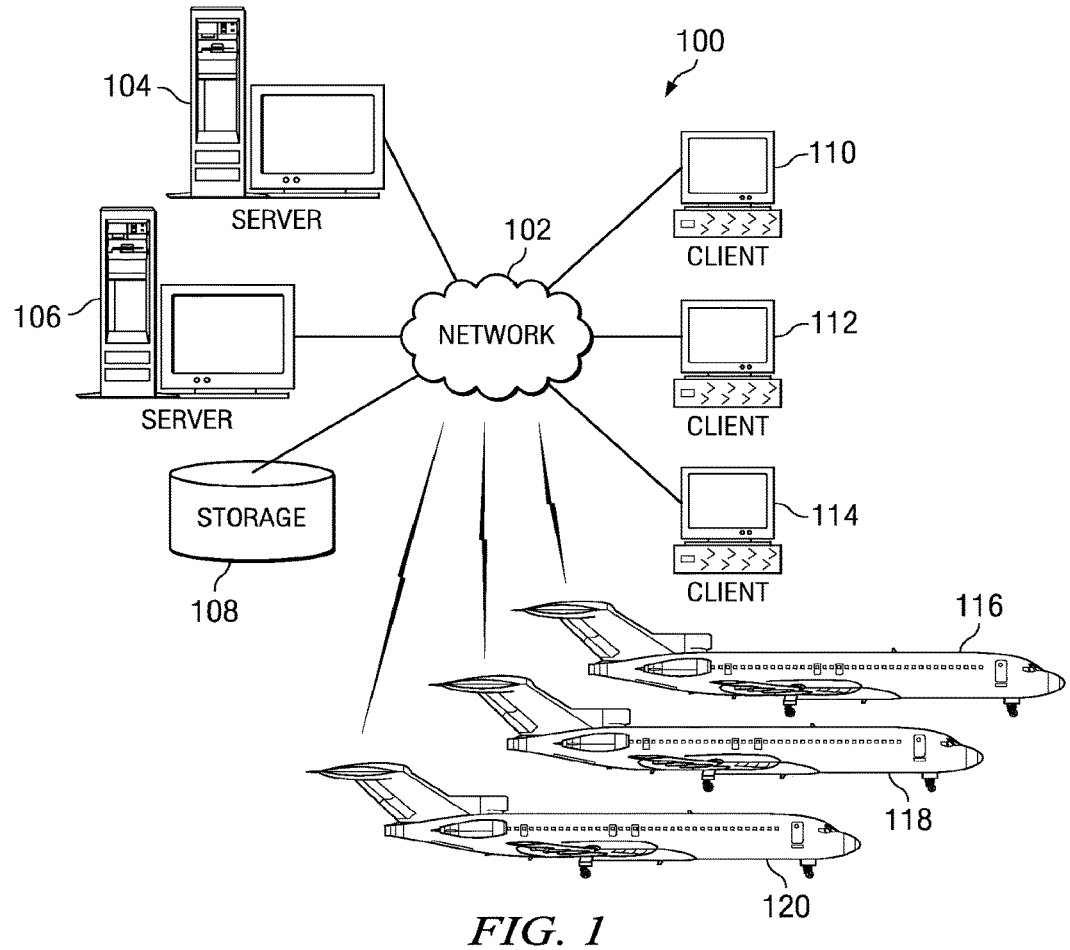
FIG. 1 is a pictorial representation of a network of data processing systems in which the advantageous embodiments of the present invention may be implemented.
Figure 2:
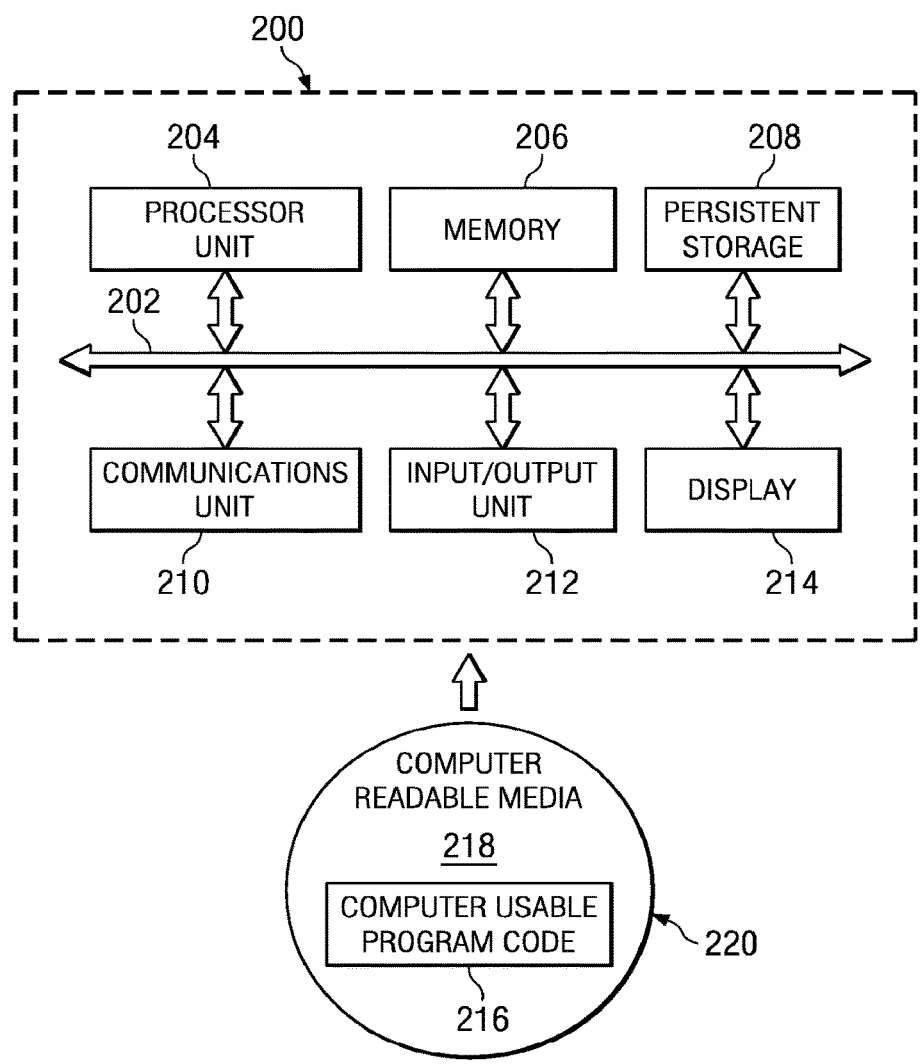
FIG. 2 is a diagram of a data processing system in accordance with an illustrative embodiment of the present invention.

With reference now to the figures, and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116, 118, and 120 also are clients that may exchange information with clients 110, 112, and 114.

Aircraft 116, 118, and 120 are additional examples of clients that also may exchange information with servers 104 and 106. These aircraft may be part of a formation and may include a tanker aircraft as well as a receiver aircraft in these examples. Aircraft 116, 118, and 120 may exchange data with different computers through a wireless communications link while in-flight or any other communications link while on the ground.

In these examples, server 104, server 106, client 110, client 112, and client 114 may be computers that provide processes to optimize air refueling for aircraft 116, 118, and 120. In these examples, the aircraft form a formation for which air refueling is planned, taking into account, each aircraft in the formation. Network data processing system 100 may include additional servers, clients, aircraft, formations of aircraft, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different advantageous embodiments.

Turning now to FIG. 2, a diagram of a data processing system is depicted in accordance with an illustrative embodiment of the present invention. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multiprocessor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204.

The computer readable program code may be embodied on different physical or tangible computer readable media, such as memory 206 or persistent storage 208.

Computer usable program code 216 is located in a functional form on computer readable media 218 and may be loaded onto or transferred to data processing system 200. Computer usable program code 216 and computer readable media 218 form computer program product 220 in these examples. In one example, computer readable media 218 may be, for example, an optical or magnetic disc that is inserted or placed into a drive or other device to that is part of persistent storage 208 for transfer onto a storage device, such as a hard drive that is part of persistent storage 208. Computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also make take the form of non-tangible media, such as communications links or wireless transmission containing the computer readable program code.

The different components illustrated for data processing system 200 are not meant to limit the architecture in which different embodiments may be implemented. The different illustrative embodiments may be implemented in a data processing system including components in addition to or in place of those illustrated for data processing system 200.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The depicted examples in FIGS. 1-2 and above-described examples are not meant to imply architectural limitations.

The different advantageous embodiments recognize that in planning refueling for an aircraft, more than one aircraft must be taken into account when a formation of aircraft is involved in a particular flight or mission. Thus, the different advantageous embodiments provide a computer implemented method, apparatus, and computer usable program code for optimizing air refueling for a formation of aircraft.

In some of the different advantageous embodiments, an apparatus is present for planning refueling of aircraft. The apparatus includes an air refueling plug-in application. This application is capable of calculating air refueling routes for a formation of aircraft. A formation of aircraft is two or more aircraft in these examples. In the different advantageous embodiments, a formation is a group of aircraft that is part of a refueling plan. The refueling plan includes all routes and their legs and all aircraft that are being jointly planned. This formation also includes legs where the aircraft are in close proximity to each other as well as legs where the aircraft are flying separate legs. The apparatus also includes other plug-in applications. A framework is present in the apparatus that is capable of providing services to the air refueling plug-in application and the other plug-in applications.

In these examples, a service is a result of data, or other information that is provided in response to a request that is made by a plug-in application. Further, the apparatus includes a first interface used by the air refueling plug-in application and the other plug-in applications. This interface is used to receive framework services from the framework. Further, a second interface is present for the air refueling plug-in application and the pull out of the plug-in applications to provide services from one plug-in application to another plug-in application.

For example, the framework may provide information or services to the air refueling plug-in application or other plug-in applications. As another example, a particular plug-in application in the plurality of plug-in applications may provide services to the air refueling plug-in application.

In another advantageous embodiment, a method for planning air refueling is present in which data is received for receiver aircraft to form received receiver data. Data also is received for a set of tanker aircraft to form received tanker data. The set of tanker aircraft is a set of one or more tanker aircraft in these examples. The first and second data is used to generate a refueling plan for use between the starting point and a destination point for the plurality of the receiver aircraft.

This refueling plan is generated in a manner to optimize a parameter, such as fuel efficiency for the receiver and tanker aircraft as a group. In other words, the fuel efficiency is optimized for fuel usage for a set of aircraft as a group in the plurality of the receiver aircraft and the set of tanker aircraft rather than individually. The set of aircraft is a set of one or more aircraft that are selected from the receiver and tanker aircraft. The set of aircraft may be, for example, all of the receiver and tanker aircraft. The set of aircraft also may be one or more receiver aircraft. As another example, the set of aircraft may be a particular receiver aircraft and a selected tanker aircraft. As a result, one receiver aircraft may have a lower fuel efficiency than others such that the fuel usage for the receiver and tanker aircraft as a group is optimized to be as low a usage as possible.

Other types of optimizations in addition to or in place of lower fuel usage may be used, depending on the implementation. For example, speed or arrival at a particular time may be other examples of optimizations that may be taken into account.

In optimizing the fuel usage in these examples, other factors also may be taken into account. For example, in generating the refueling plan, a certain time of arrival or in route time may be required for the formation as a group. Thus, the fuel usage is optimized such that the lowest amount of fuel is used in meeting the arrival time or in-flight time that is required. As a result, the fuel usage may not be as low as compared to a refueling plan that does not take into account or give any priority or weight to other factors other than minimizing fuel usage for the group of aircraft. In this manner, the method, apparatus, and computer usable program product in the different embodiments may be used to manage the refueling of aircraft.

Figure 3:
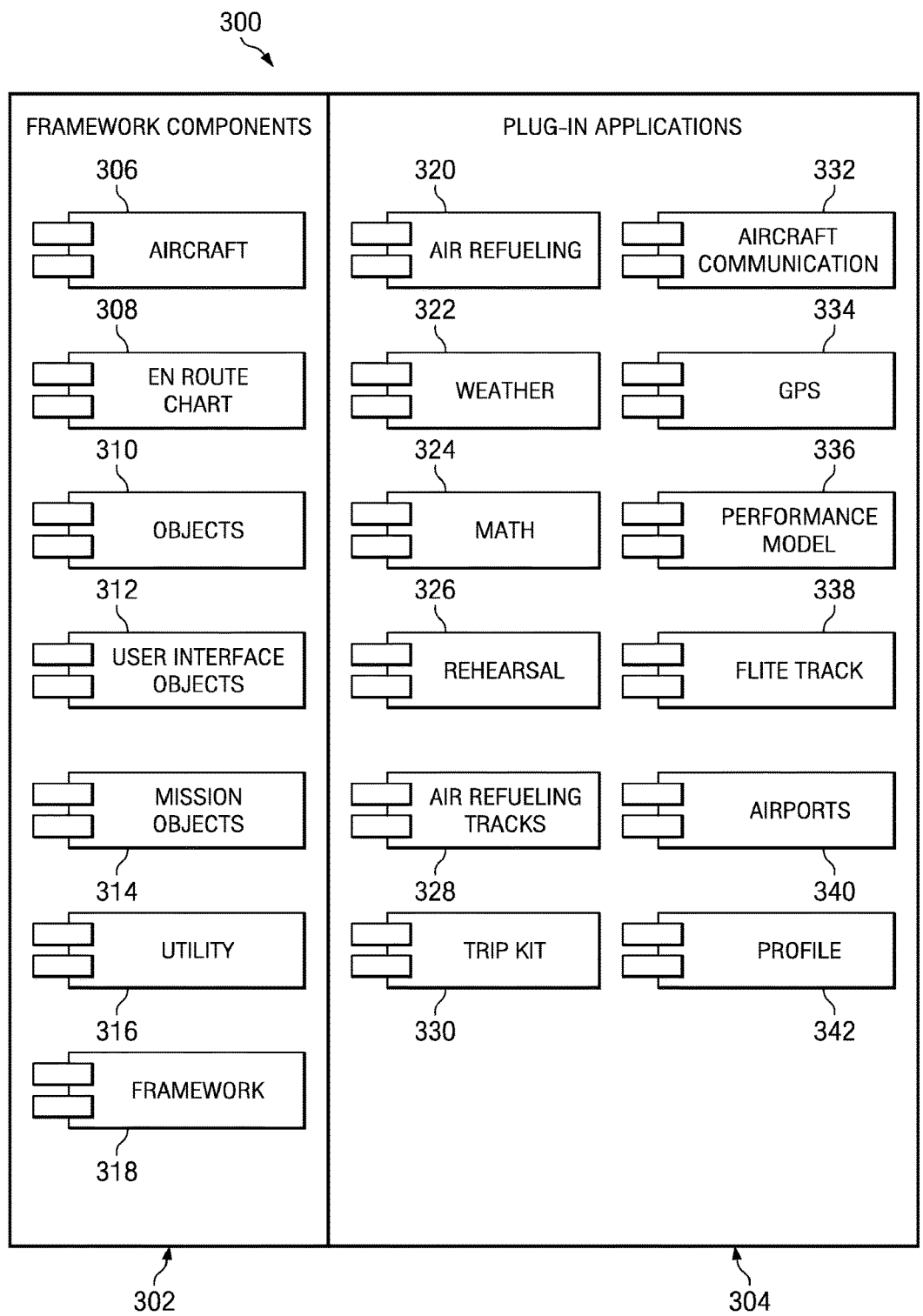
FIG. 3 is a diagram illustrating air refueling application components in accordance with an advantageous embodiment.

Turning now to FIG. 3, a diagram illustrating air refueling application components is depicted in accordance with an advantageous embodiment. In this example, air refueling application 300 includes framework components 302 and plug-in applications 304. The different components within framework components 302 make up a framework for air refueling application 300. The different components illustrated represent an executable program or process for a library.

In these examples, framework components 302 include aircraft 306, en route chart 308, objects 310, user interface objects 312, mission objects 314, utility 316, and framework 318. Plug-in applications 304 include, in these examples, air refueling plug-in application 320, weather plug-in application 322, math plug-in application 324, rehearsal plug-in application 326, air refueling tracks plug-in application 328, trip kit plug-in application 330, aircraft communication plug-in application 332, global positioning system (GPS) plug-in application 334, performance model plug-in application 336, flite track plug-in application 338, airports plug-in application 340, and profile plug-in application 342.

In this example, framework 318 controls display and functionality for air refueling application 300. Framework 318 provides interfaces to services that may be provided by other components within framework components 302 or in plug-in applications 304. A plug-in application is a computer program or process that interacts with another computer program or process. A plug-in application may provide or add functionality to an overall application. A plug-in application typically provides a certain or specific function on demand.

For example, plug-ins may provide access to weather information, calculations, or specific types of data, such as aircraft models. Plug-in applications may interface with other plug-in applications through a set of interfaces, such as an application programming interface. Of course, any type of interface may be used in which the plug-in application and the other applications use a protocol to exchange data between plug-in applications and the application.

Framework 318 may provide features, such as creation and editing of user waypoints on an en route chart, searching for navigation data objects and return properties about those objects and provide features to build a route using plain language routing. Further, framework 318 also may allow for an ability to configure the particular look and feel of an application. In these examples, framework 318 allows for different plug-in applications to manipulate tool bars, change of views, and create their own views. Framework 318 also allows for the display, creation, and editing of route files. The functionality to set anchor points and obtain distance in headings between points is provided through framework 318.

Further, displaying flight information in response to receiving global positioning signal is an example of another feature that may be provided by framework 318. Also, flight information may be customizable and displayed as a transparent box over an en route chart through framework 318. Additionally, interfaces to obtain data, such as aircraft position, and map orientation heading up, or north up features may be provided through framework 318.

Aircraft 306 is a component in framework components 302 that manages and sets aircraft properties for use in generating a route for air refueling. En route chart 308 controls interaction with a map rendering and drawing engine (not shown). This map rendering and drawing engine is used to provide the processes necessary to generate an en route chart to display routes for one or more aircraft, as well as the location of these aircraft on the map. In addition, en route chart 308 controls access to en route data. In these examples, the en route data includes data, such as the position of the aircraft, the speed of the aircraft, as well as other information.

Objects 310 is a component that contains common objects in the application. Examples of objects are chart object, LatlonAlt, and RangeBearing.

User interface objects 312 contain common user interface objects that may be used to provide a user interface for air refueling application 300. User interface objects may include, for example, different objects for windows, controls, and images. Mission objects 314 contain objects that are used for routing in generating object overlays on an en route chart. Utility 316 contains general utility classes. In these examples, these classes include, for example, unit conversion, simple math functions, and menu interfacing classes.

Air refueling plug-in application 320 controls, manages, calculates, and displays air refueling data in these examples. Further, air refueling plug-in application 320 also contains air refueling algorithmic processes. The air refueling processes are used to plan the formation route with associated air refueling points. The processes within air refueling plug-in application 320 perform calculations with data provided by other plug-in applications and framework 318. This data includes, for example, aircraft properties, refueling rules, routes, divert bases, performance, and other information of data.

The processes in this particular component allow the routes for multiple aircraft of different types in a formation to be optimized by various parameters, such as fuel, time, and flight path in a single formation.

Further, air refueling plug-in application 320 interfaces with framework 318 to generate displays for air refueling data. These displays include, for example, presentations of aircraft properties, routes, generation of a formation, display of aircraft information, and display of air refueling events.

Weather plug-in application 322 provides interfaces to weather providers and data access methods. This component may be implemented or used by air refueling plug-in application 320 to obtain weather information, such as wind, temperature, and pressure for a specific location and altitude. Further, this component also may allow access to "real time" or current weather data from different providers or sources. In these examples, this plug-in application does not store data but provides a mechanism or interface to access weather data from other sources.

Math plug-in application 324 contains functions used to perform different types of calculations. For example, math plug-in application 324 includes functions to perform atmospheric calculations that are used by an air refueling algorithm present within air refueling plug-in application 320. Next, rehearsal plug-in application 326 allows for traversing of a planned formation to see fuel states, offloads, and other fuel events as they may occur. This particular component allows a user to manipulate a plan through the tables and an en route chart to force recalculations and what-if scenarios. In other words, this particular plug-in application may be used to simulate different events for the air refueling plan.

Air refueling tracks plug-in application 328 is a component that allows for the display of air refueling tracks from different types of data, such as digital aeronautical flight information file (DAFIF) data, to be rendered on an en route chart. This type of information is up-to-date aeronautical data, including, for example, information on airports, airways, air spaces, navigation data, and other information relevant to flying. Trip kit plug-in application 330 provides printing functionality to output data, such as routes, weather, and charts.

Aircraft communication plug-in application 332 provides interfaces to retrieve and store data from various communication sources. These sources include, for example, an aircraft computer or flight system and secure radios. Messages from these systems are parsed into a data stream and stored on the system for generating real time updates to a refueling plan generated by air refueling plug-in application 320. In other words, aircraft communication 332 provides a source of dynamic or current data that may be used to dynamically change an air refueling plan. This particular component provides for current or real time type data that allows for changes to a refueling plan to be dynamically made as new data is received.

Global positioning system (GPS) plug-in application 334 is a component that provides global positioning information. In other words, this component provides location information for an aircraft. Further, this component also may provide speed and directional information. Of course, other types of plug-in applications may be used to provide location information other than global positioning system plug-in application 334, depending on the particular implementation. For example, information may be obtained from an inertial navigation system, which may use angular accelerometers, linear accelerometers, or gyroscopes.

Performance model plug-in application 336 provides interfaces to models for different aircraft. Further, this particular plug-in application provides functions to calculate and interpret different performance tables for different aircraft models. In addition, performance model plug-in application 336 provides performance data to a refueling process within air refueling plug-in application 320 to optimize a set of one or more parameters for multiple aircraft. This set of parameters may be a set of one or more parameters. The parameters may include, for example, fuel usage, time, or flight path. One or more of these parameters and other parameters may be optimized, depending on the particular implementation.

Next, flite track plug-in application 338 provides for tracking of multiple aircraft from a variety of different data streams. This plug-in is used to render data on an en route chart such as that provided by en route chart 308. Airports plug-in application 340 contains an airport list and provides data to other components about available airport selections and charts. Profile plug-in application 342 provides a profile view to the interface and allows for querying of information in this particular view. In these examples, a profile view is a graph of the altitudes of the ground and the route along the path of the route.

The different components within framework components 302 and plug-in applications 304 are described as an example of components that may be used to generate routes for air refueling with plug-in applications 304 in air refueling application 300. The representation of these components and their functions in FIG. 3 are not meant to limit the manner in which different plug-in applications may be implemented.

For example, a particular plug-in may include multiple functions, depending on the particular implementation. In one example, access to data, such as data from aircraft and data used to track aircraft may be provided in a single plug-in application, rather than through aircraft communication plug-in application 332 and flite track plug-in application 338.

Additionally, depending on the particular implementation and data needed for a particular type of air refueling process to calculate air refueling routes, other plug-in applications may be used in addition to or in place of the ones illustrated in plug-in applications 304. Moreover, framework components 302 may include components in addition to or in place of those illustrated in framework components 302.

The different components illustrated in framework components 302 in air refueling application 300 are provided as an example of a framework in which an interface is provided to different plug-in applications to obtain services from the framework. Further, plug-in applications may use a second interface in framework 318 to provide services to other plug-ins that are used with the framework.

The interfaces in framework 318 may be implemented using a number of different mechanisms. For example, a plug-in may communicate with other plug-ins and with the framework using an application programming interface. Any type of interface in which a standard or expected format to requests and responses to those requests may be implemented to provide the services in these examples.

With air refueling application 300, a refueling plan may be created or formed for a formation of aircraft in which different parameters are optimized. These parameters include fuel usage, time of arrival, or distance. These parameters may be optimized for the formation as a whole, rather than individual aircraft. Further, with air refueling application 300, simulations of missions may be made using simulated or historical data. Further, air refueling application 300 may be employed in a dynamic manner in which data is received from the different aircraft in the formation as the mission or flight proceeds.

Additionally, updates to other types of data, such as weather information also may be received based on real time or where the most current data available for these and other factors in air refueling plans. Based on receiving new data as the flight occurs, air refueling application 300 may modify or change the air refueling plan generated for the formation to take into account changes.

Figure 4:
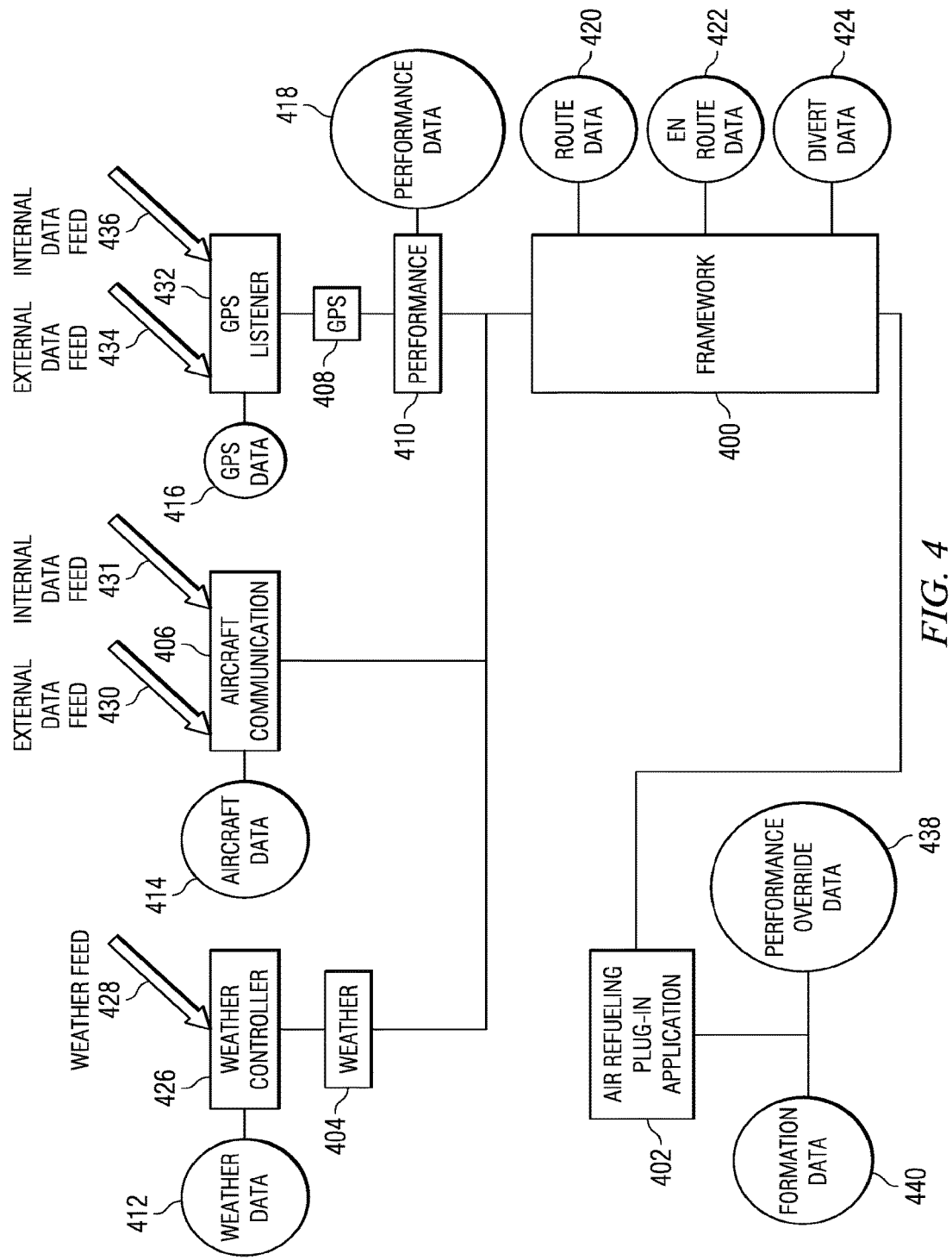
FIG. 4 is a diagram illustrating data flow components used to create an air refueling plan in accordance with an advantageous embodiment.

With reference now to FIG. 4, a diagram illustrating data flow components used to create an air refueling plan is depicted in accordance with an advantageous embodiment. The different plug-in applications in framework components described in FIG. 4 are examples of framework components 302 and plug-in applications 304 in air refueling application 300 in FIG. 3. FIG. 4 is a specific example of data flow that may occur within an air refueling system, such as air refueling application 300 in FIG. 3. Examples of air refueling calculations, the sources of data, and the providers of data are depicted in these examples.

In this example, framework 400 is an example of a framework containing components, such as framework components 302 in FIG. 3. Framework 400 provides an interface to plug-in applications, such as air refueling plug-in application 402, weather plug-in application 404, aircraft communication plug-in application 406, global positioning system plug-in application 408, and performance plug-in application 410.

Air refueling plug-in application 402 sends a request to framework 400 for one or more services. In these examples, multiple services may be requested by air refueling plug-in application 402. In these examples, data, such as weather data, aircraft data, global positioning system data, and performance data are provided to air refueling plug-in application 402 through framework 400. More specifically, other plug-in applications provide this information to air refueling plug-in application 402 through an interface in framework 400. Further, framework 400 also provides other services, such as route data 420, en route data 422, and divert data 424.

In these examples, weather data 412 is provided by weather plug-in application 404. This plug-in application requests weather data from a source, such as weather controller 426. Weather controller 426 may provide weather data 412 from sources, such as weather feed 428. Weather controller 426 is a source that may collect the data in various formats and parse the data and place it into a common format for storage in a weather data depository. Weather data 412 is used by air refueling plug-in application 402 for different fuel consumption calculations and generating an air refueling route. The data used includes, for example, wind, pressure, and temperature data at different altitudes.

Weather data 412 may be obtained from a single source or multiple sources, depending on the particular implementation. This data may be static or dynamic data. Static data is historical or data that has been collected for past times. Dynamic data, in these examples, is current data, real time data, or forecast data. An example is data obtained from a real time satellite feed. Weather plug-in application 404 may request weather data 412 from weather controller 426 and return this information to air refueling plug-in application 402 through an interface in framework 400.

Aircraft communication plug-in application 406 receives aircraft data and may store the data in a data store or stream the data to a plug-in, such as air refueling plug-in application 402 through an interface in framework 400. Aircraft data 414 contains data about an aircraft. This data may be obtained by aircraft communication plug-in application 406 from internal data feed 431 located in the aircraft in which an application executes or from external data feed 430. External data feed 430 may provide data about other aircraft in the formation. The data in aircraft data 414 includes, for example, speed, heading, fuel state, fuel usage, tail number, nationality, transfer rate, transfer degradations, latitude, and longitude.

Global positioning data 416 may be obtained from global positioning system listener 432. Global positioning system listener 432 may obtain location information from external data feed 434 or internal data feed 436. Global positioning system listener 432 may retrieve and search for global positioning system data 416 in a format specified or requested by global positioning system plug-in application 408. Global positioning system data 416 may be stored or streamed to global positioning system plug-in application 408 for use by air refueling plug-in application 402. As with other plug-ins, global positioning system plug-in application 408 sends data to air refueling plug-in application 402 through an interface in framework 400.

Performance plug-in application 410 obtains performance data 418 for specified aircraft. Performance data 418, in these examples, contains data about aircraft models and how the aircraft perform under certain conditions. Performance data 418 may be stored on a remote storage or local storage depending on the particular implementation. This data is sent to air refueling plug-in application 402 through an interface in framework 400.

In these examples, route data 420, en route data 422, and divert data 424 may be provided to air refueling plug-in application 402 through another interface in framework 400. Route data 420 contains routes associated with points used by the formation for the aircraft in which air refueling plug-in application 402 is generating an air refueling plan. En route data 422 contains navigational vector points in an en route navigational database. This information is used by air refueling plug-in application 402 to perform calculations in-flight planning. Divert data 424 contains information about airfields used for divert bases in a formation of aircraft.

In these examples, this type of data may be obtained from any external source. The divert bases found in divert data 424 are used by air refueling plug-in application 402 for use in air refueling calculations. This information may include a number of different parameters, such as, for example, maintenance facilities, runway length, fuel type, location, clearances, approaches, and other information. Divert data 424 is provided to air refueling plug-in application 402 through an interface in framework 400 in these examples. In these examples, air refueling plug-in application 402 also may receive data from other sources, such as from user input.

Performance override data 438 may be inputted through an interface to override characteristics that may be found in a performance model of an aircraft in performance data 418 obtained through performance plug-in application 410. This interface to enter performance override data 438 is found in air refueling plug-in application 402 in these examples.

Further, air refueling plug-in application 402 may use formation data 440. Formation data 440 is data unique to a specified formation. This data is specific to each particular aircraft selected for a formation. Formation data 440 may include, for example, a compiled route containing calculated air refueling points on the route.

Also included in formation data 440 is, for example, calculated on load and offload events for a formation. Other types of data found in formation data 440 include, for example, events for time, location, maps, messages, and fuel events. Formation data 440 also may include formation information, such as, mission name, communication frequency, and any other notes.

In these examples, formation data 440 may be stored in a file that is input and received for use by air refueling plug-in application 402. Other information in performance data 440 may include properties on how the formation is rendered on a map. This information is received directly by air refueling plug-in application 402 through interfaces provided by this component in these examples.

As can be seen in FIG. 4, real time or current data may be received by the different plug-in applications for use by air refueling plug-in application 402. This streaming of information while the flight or mission occurs allows air refueling plug-in application 402 to create modifications to an air refueling plan for a formation of aircraft. Further, this type of data also may be used to run simulations for different aircraft over different conditions.

Figure 5:
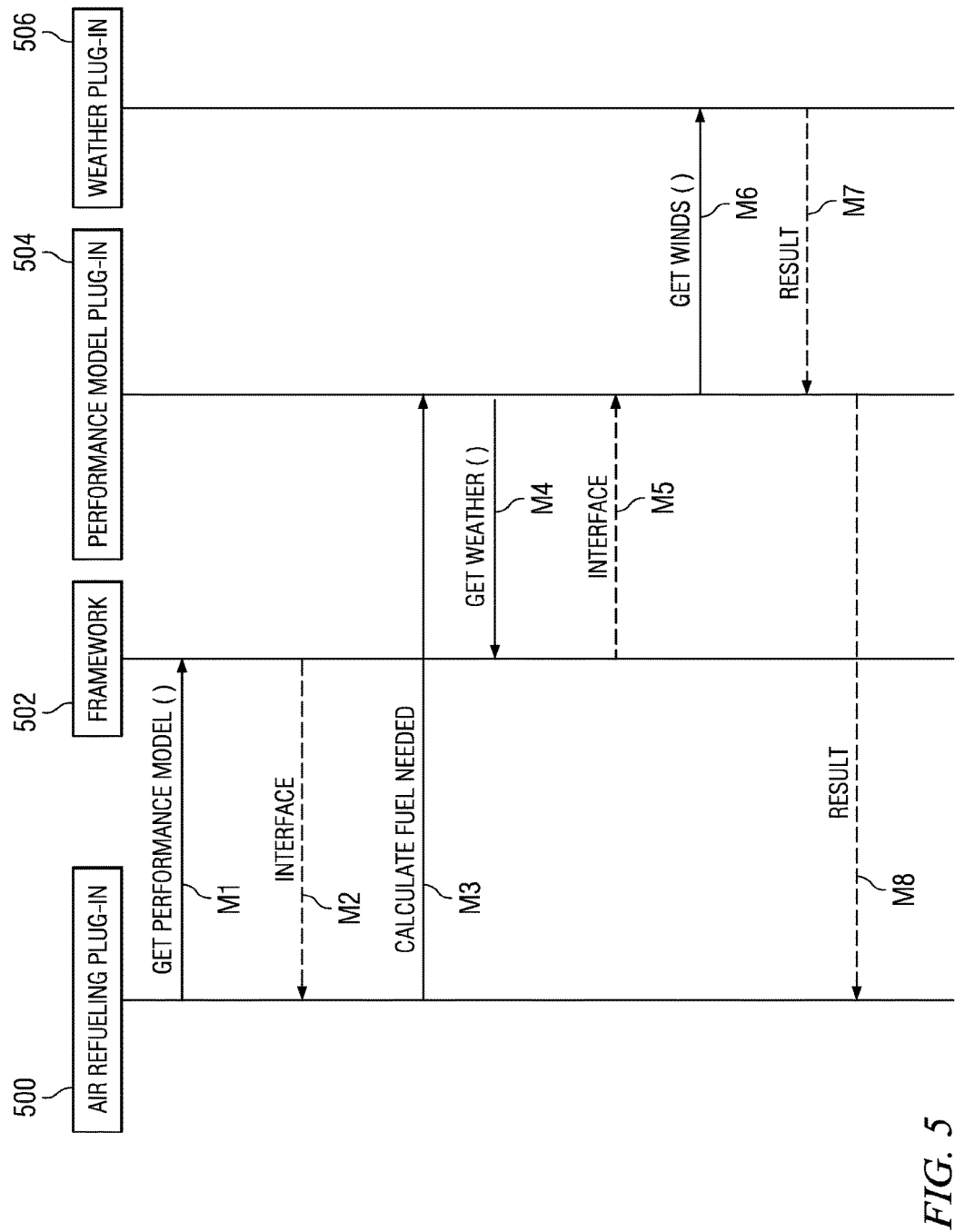
FIG. 5 is a diagram illustrating message flow between a plug-in and a framework to obtain services from the framework in accordance with an advantageous embodiment.

Turning now to FIG. 5, a diagram illustrating message flow between a plug-in and a framework to obtain services from the framework is depicted in accordance with an advantageous embodiment. This series of message flows is depicted for air refueling calculations made by air refueling plug-in application 500. In this example, air refueling plug-in application 500 is the same as air refueling plug-in application 320 in FIG. 3.

As illustrated, air refueling plug-in application 500 may obtain services from other plug-ins through framework 502. In the depicted example, the other plug-ins from which services may be obtained are performance model plug-in application 504 and weather plug-in application 506. Framework 502 is the same as framework 318 in FIG. 3. Performance model plug-in application 504 and weather plug-in application 506 are the same as weather plug-in application 322 and performance model plug-in application 336 in FIG. 3 in these examples.

The message flow begins with air refueling plug-in application 500 sending a request to framework 502 for a performance model (message M1). In response, framework 502 returns an interface to performance model plug-in application 504 to air refueling plug-in application 500 (message M2). The interface is returned to a plug-in application in these examples by returning a pointer or address to the interface. In response to receiving the interface to performance model plug-in application 504, air refueling plug-in application 500 sends a request to performance model plug-in application 504 to calculate fuel needs (message M3).

In this example, in identifying the fuel needs, performance model plug-in application 504 requires weather data and requests a service to obtain weather information from framework 502 (message M4). In response to receiving the request, framework 502 returns an interface to weather plug-in application 506 to performance model plug-in application 504 (message M5). Upon receiving the interface to weather plug-in application 506, performance model plug-in application 504 requests wind information from weather plug-in application 506 (message M6). Weather plug-in application 506 returns a result containing the wind information (message M7). With this information, performance model plug-in application 504 calculates the fuel needs and returns the result to air refueling plug-in application 500 (message M8).

Figure 6:
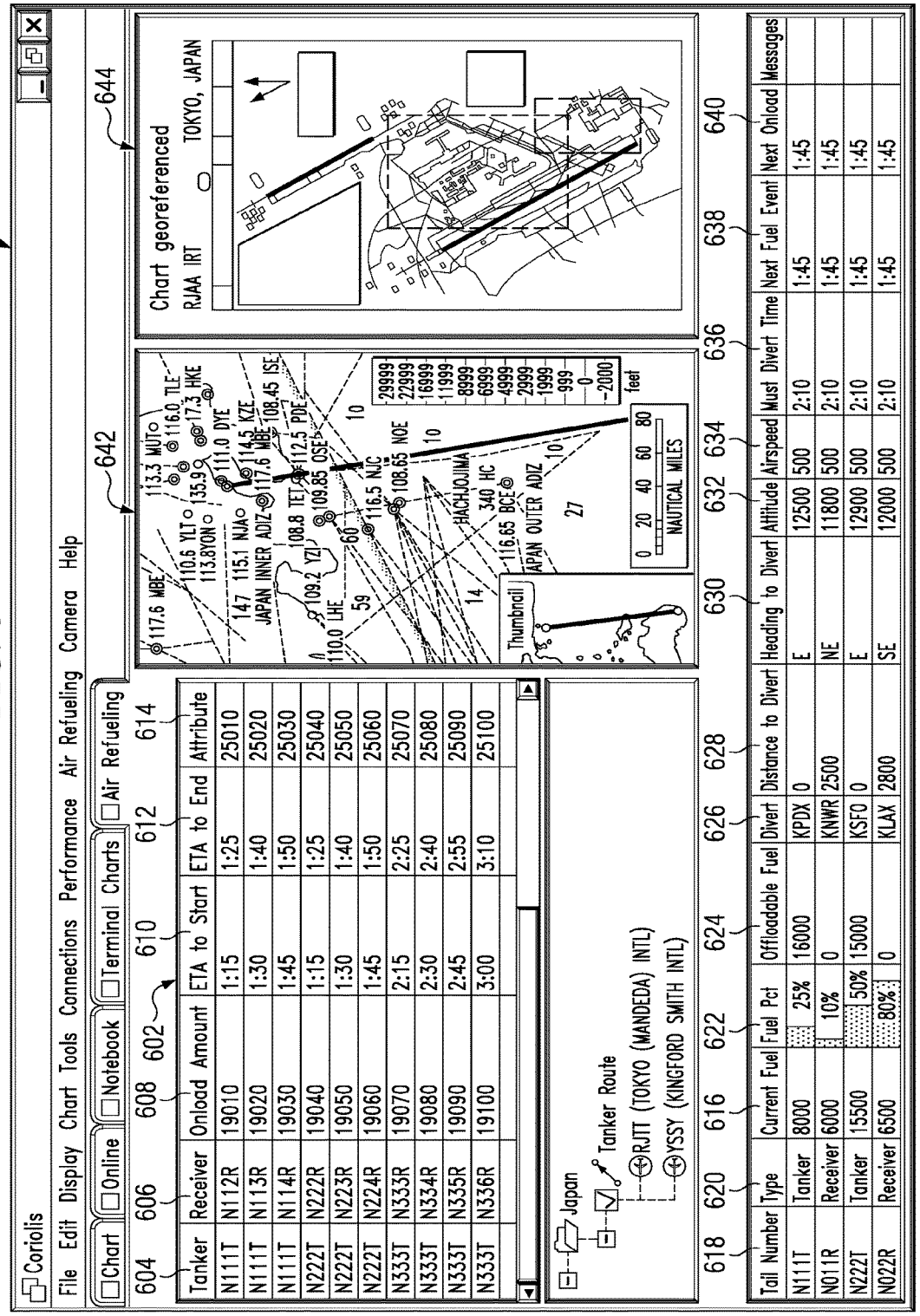
FIG. 6 is a diagram illustrating the presentation of air refueling information in accordance with an advantageous embodiment.

Turning now to FIG. 6, a diagram illustrating the presentation of air refueling information is depicted in accordance with an advantageous embodiment. In this example, display 600 is an example of air refueling information that may be presented in the different advantageous embodiments. Display 600 presents various types of air refueling information generated using the different processes in the advantageous embodiment.

Section 602 in display 600 provides a list of tankers in column 604 and a list of receiver aircraft in column 606. This information in section 602 also includes the onload amount in column 608 as well as estimated time of arrival for start and end points in refueling in columns 610 and 612. Further, the altitude for these particular points also is found in column 614.

Further, display 600 also presents current information regarding the different tanker aircraft and receiver aircraft in section 616. Column 618 provides tail numbers for the aircraft. Column 620 presents the type of aircraft. The percent of fuel is displayed for each aircraft in column 622. Offloadable fuel, fuel that may be used to refuel another aircraft, is presented in column 624. Divert information is shown in columns 626, 628, and 630. Information, such as altitude and airspeed, is shown in columns 632 and 634. Other air refueling information, such as maximum divert time, next fuel event, and next onload is shown in columns 636, 638, and 640. The fuel percentage in column 622 is shown as a graphical bar to more easily identify critical situations with respect to fuel consumption.

Section 642 illustrates the different routes and divert points for a portion of a route for which an air refueling plan has been generated. Section 644 presents chart information. In this manner, display 600 provides a user with an ability to view air refueling information in a manner that allows for identification of a status of multiple aircraft in a formation.

Figure 7:
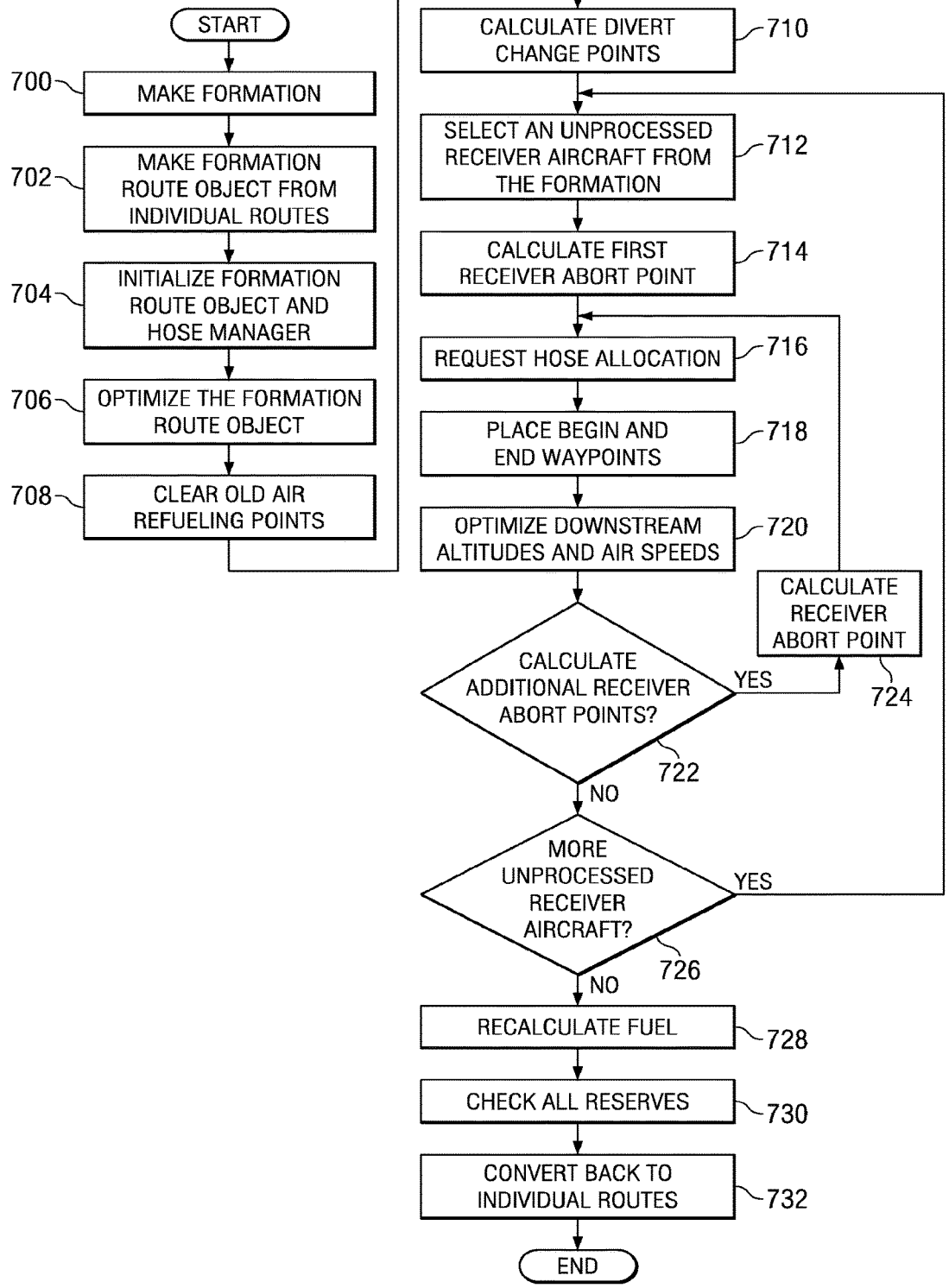
FIG. 7 is a flowchart of a process for generating an in-trail air refueling plan in accordance with an advantageous embodiment.

Turning now to FIG. 7, a flowchart of a process for generating an in-trail air refueling plan is depicted in accordance with an advantageous embodiment. An in-trail air refueling plan is one in which receiver aircraft and tanker aircraft stay together for the entire flight. The process illustrated in FIG. 7 may be implemented in an air refueling plug-in application, such as air refueling plug-in application 320 in FIG. 3.

The process begins by making a formation (operation 700). In this example, the formation is made by selecting aircraft for the formation. In particular, two or more aircraft are selected to form a formation of aircraft in these examples.

Thereafter, a formation route object is made from the individual routes for each aircraft in the formation (operation 702). In these examples, a formation route object holds and performs operations on a graph formed by nodes and legs. The object is a part of a class that has a list of pointers to all start nodes in the graph for a formation. The functions may include, for example, planned air refueling, calculating diverts, or calculating fuel. The formation route object contains all of the nodes and legs for the different aircraft in the formation as created in operation 702.

The process then initializes the formation route object and the hose manager (operation 704). This operation establishes a list of tankers and receiver aircraft for the formation route object. The hose manager, initialized by this operation, is used to determine all the hoses that are available and to which tanker aircraft the different hoses belong. Further, this operation is used to set the type of air refueling that is to be performed. The air refueling may be, for example, in trail or rendezvous.

Thereafter, the process optimizes the formation route object (operation 706). In this operation, the process corrects any climbs or descents that are too steep. This operation is used to identify an optimal speed on all of the different legs. These legs include the legs for a single aircraft as well as legs for multiple aircraft in the formation. This operation is used to establish a joint rate of climb and descent that are compatible with all of the aircraft that are present in a particular leg.

Afterwards, old air refueling points are cleared (operation 708). This operation deletes all waypoints in the formation route object that are of any type of air refueling waypoints. In other words, any air refueling waypoints that were present in the original routes that were combined into the formation route object are cleared or deleted. Next, the process calculates divert change points (operation 710). This operation is used to identify locations and add divert change points to the formation route. A divert change point is a waypoint that specifies that the current divert airport is changing.

After calculating the divert change points, an unprocessed receiver aircraft is selected from the formation (operation 712). Thereafter, a first receiver abort point is calculated (operation 714). The receiver abort point is a waypoint at which a receiver aircraft must terminate its attempt to attach to a hose and proceed to the current divert airport. This abort point requires the receiver aircraft to abort even if the receiver aircraft has attached, but for some reason no fuel flow has yet been established. In other words, operation 714 determines the point on the route from which the receiver aircraft can make it to the current divert airport and still meet reserve requirements for fuel. This waypoint is added to the formation route object at the appropriate location.

A divert route also is calculated and constructed from the receiver abort point to the current divert airport. The fuel is calculated along this route and reserves at the divert airport are verified. In this manner, the exact location of the receiver abort point may be identified by a combination of estimation and iteration of calculations.

The process then requests a hose allocation (operation 716). In operation 716, the process calls a hose manager to request a hose allocation associated with a receiver abort point. The hose manager determines if a hose is available and makes a new allocation object on the hose and returns a pointer to the hose if one is available. If a hose is unavailable, the hose manager may try to allocate a hose ahead of that time or it may return a null response if no hose can be allocated. Further, the hose allocation takes into account the previous hose allocations. The duration of a hose allocation may be determined based on an aircraft's fuel state for transferring a specific amount of fuel. Further, the proximity of the destination also is taken into account by the hose manager.

The process then places a start and stop point (operation 718). This operation creates begin and end waypoints and inserts these waypoints into the formation route in the proper place based on the hose allocation time. A begin waypoint is a point at which fuel transfer starts. This waypoint is the location and time where an air refueling plan calls for the fuel transfer to begin. An end waypoint is a waypoint at which the fuel transfer stops. At this point, the receiver aircraft should disconnect. The end waypoint may change if the begin waypoint is early or late.

The process then optimizes the down stream altitudes and air speeds (operation 720). This operation re-optimizes the formation route downstream of the just inserted beginning waypoints for the hose allocation. The weight of the receiver aircraft and the tanker aircraft may change resulting in a different optimum speed and possibly a different altitude.

The process then determines whether additional receiver abort points should be calculated (operation 722). then steps down the remaining route to calculate an additional receiver abort point. It may be that no additional abort points are needed or it may be determined that another one is needed. If an additional receiver abort point is needed, the additional receiver abort point is calculated and added into the formation route (operation 724). The process then returns to operation 716 to request a hose allocation. If an additional receiver abort point is not needed, the process then determines if more unprocessed receiver aircraft are present (operation 726). If additional receiver aircraft are present, the process returns to operation 712.

A determination is made as to whether additional unprocessed receiver aircraft are present in the formation route object (operation 716). If additional unprocessed receiver aircraft are present, the process returns to operation 712 to select another unprocessed receiver aircraft for processing. If no additional unprocessed receiver aircraft are present, the process continues at operation 718.

Otherwise, the process recalculates the fuel needed (operation 728). This operation recomputes the fuel burn quantities across the entire formation route. The operation does not re-optimize altitudes or speeds. The process then checks all reserves (operation 730). In this operation, the process checks all of the specified fuel amounts to determine whether they were met for all legs of the route for the formation. This check includes all divert route legs and receiver abort point divert route legs.

The process then converts the formation route back into individual routes (operation 732) with the process terminating thereafter. This operation is an optional one in which the process may extract each aircraft individual route from the formation route. The individual routes may then be sent to the flight management system for each aircraft.

Figure 8:
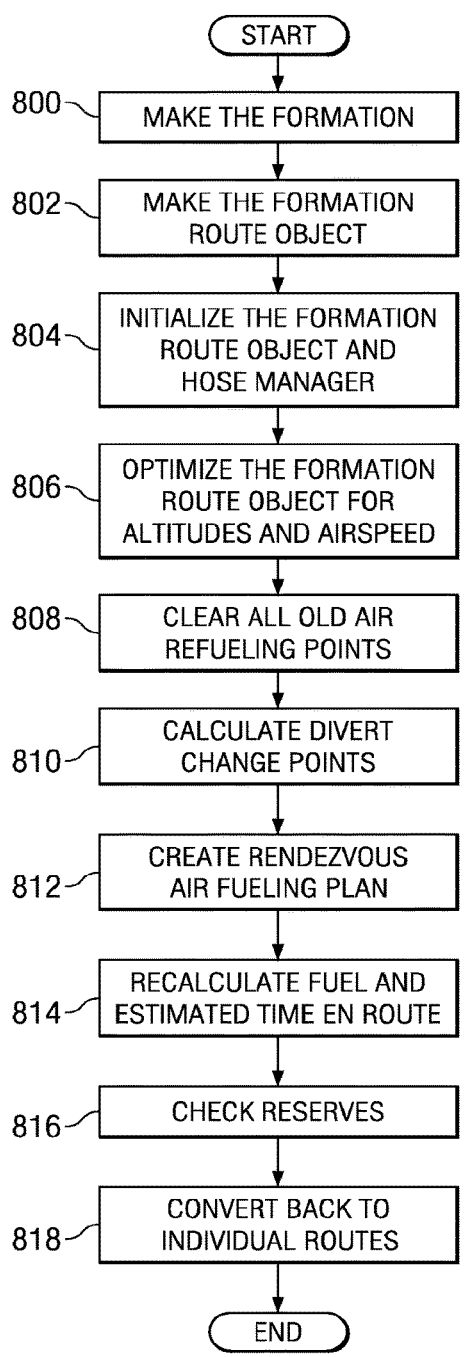
FIG. 8 is a flowchart of a process for generating a rendezvous air refueling plan in accordance with an advantageous embodiment.

With reference now to FIG. 8, a flowchart of a process for generating a rendezvous air refueling plan is depicted in accordance with an advantageous embodiment. A rendezvous air refueling plan is one in which tanker aircraft are based at another airport and will rendezvous or join up with receiver aircraft at some point during the mission. In these examples, the tanker aircraft fly less distance than the receiver aircraft in the formation. The process illustrated in FIG. 8 is implemented in the software component; the air refueling plug-in application 320 in FIG. 3.

The process begins by making a formation (operation 800). Operation 800 is used to identify the aircraft that will be in the formation. Thereafter, a formation route object is made (operation 802). In this operation, existing routes for the different aircraft in the formation are combined into a formation route object. This formation route object contains the information for the route used for the air refueling calculations in these examples.

Next, the process initializes the formation route object and a hose manager (operation 804). This operation is used to establish the list of tanker aircraft and receiver aircraft in the formation route object. The hose manager is used to determine all the hoses that are available and which tanker aircraft they belong to. This portion of the process also is used to set the type of air refueling planning that is to occur.

Thereafter, the process optimizes the formation route object for altitudes and air speed (operation 806). Next, old air refueling points are cleared from the formation route (operation 808). This operation is used to clear any waypoints that are for air refueling. This operation removes prior air refueling waypoints generated for the individual routes prior to making the formation route.

The process then calculates divert change points (operation 810). This operation is used to determine the locations of divert change and add these identified divert change points to the formation route object. The rendezvous air refueling plan is created (operation 812). Thereafter, the process recalculates its fuel and estimated time in route (operation 814).

The process then checks reserves (operation 816). This operation checks to ensure that all of the specified reserve fuel amounts were met on all legs of the route in the formation route object. This includes all divert route legs and receiver abort point divert route legs. Then, the process converts the formation route object back to the individual routes for each of the aircraft in the formation (operation 818) with the process terminating thereafter.

Figure 9:
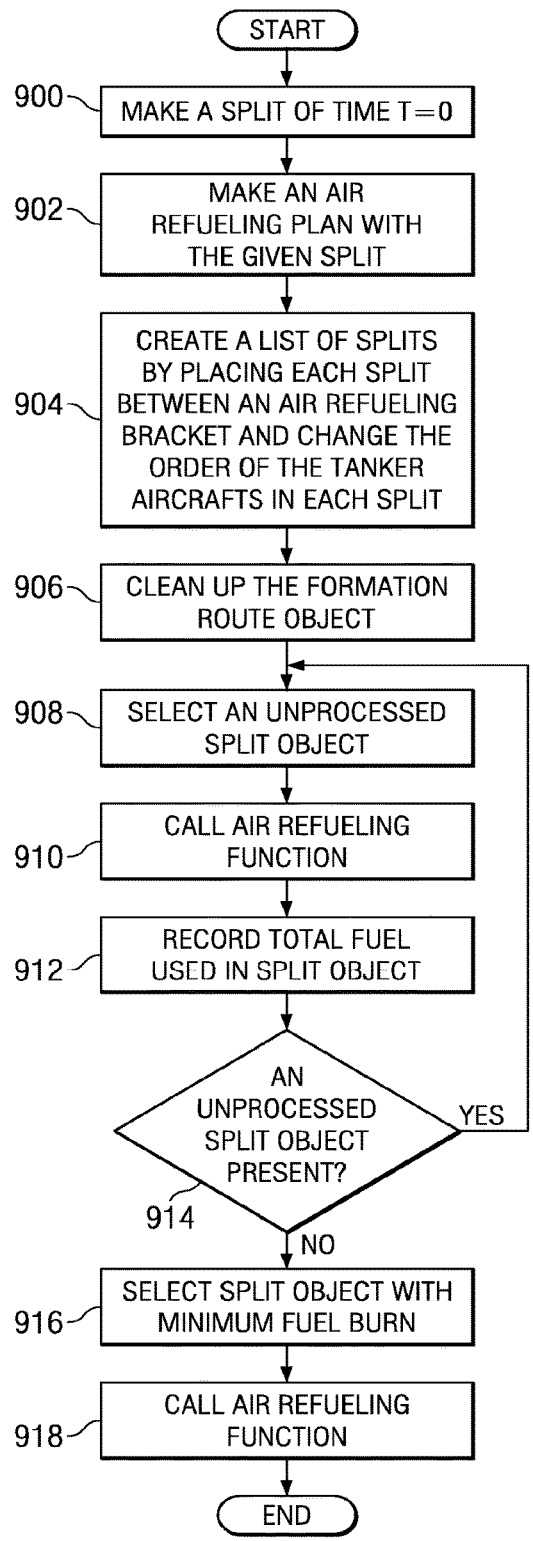
FIG. 9 is a flowchart of a process to generate air refueling points for a rendezvous air refueling plan in accordance with an advantageous embodiment.

Turning now to FIG. 9, a flowchart of a process to generate air refueling points for a rendezvous air refueling plan is depicted in accordance with an advantageous embodiment. The process illustrated in FIG. 9 is a more detailed description of operation 812 in FIG. 8.

The process begins by making a split software object of time T=0 (operation 900). The split object holds the value of when air-refueling operations switch from using one tanker to the second tanker. As a result, all air-refueling requests by receivers before the split time will be serviced by the first tanker, and all requests after the split time will be processed by the second tanker. Ultimately, the fuel used by all aircraft will be compared between all of the split objects and split object with the least total fuel burn will be selected.

Thereafter, an air refueling plan is generated with the first tanker used before the split time and the second tanker used after the split time (operation 902). This particular operation is described in more detail below with reference to FIG. 10.

Next, the process creates a list of splits by placing a split between an air refueling bracket and changing the order of the tanker aircraft in each split (operation 904). Each split in the list is placed in or takes the form of a split object in these examples. In operation 904, a list of all possible split times to be tried is generated by choosing split times between air refueling brackets. The order of tankers is changed by reversing order in this particular operation. Each split object generated has information needed to define an air refueling plan in these examples.

The process then cleans up the formation route object (operation 906). In this particular operation, the air refueling points are deleted from the formation route so that a function to plan air refueling may be called. In these examples, this air refueling function is described in more detail with reference to FIG. 10 below.

Then, an unprocessed split object is selected from the split objects created in operation 904 (operation 908). Thereafter, the process calls an air refueling function (operation 910). This air refueling function is described in more detail below with respect to FIG. 10. After the results are returned from the call, the total fuel used in the split object is recorded (operation 912). The split object contains information generated from calling the air refueling function.

Next, a determination is made as to whether an additional unprocessed split object is present (operation 914). If an unprocessed split object is present, the process returns to operation 908 to select another unprocessed split object for processing.

Otherwise, the process selects a split object with the minimum fuel burn (operation 916). Thereafter, the air refueling function is called (operation 918). This function is called again to regenerate the solution associated with the best split object identified. The process then terminates.

Figure 10:
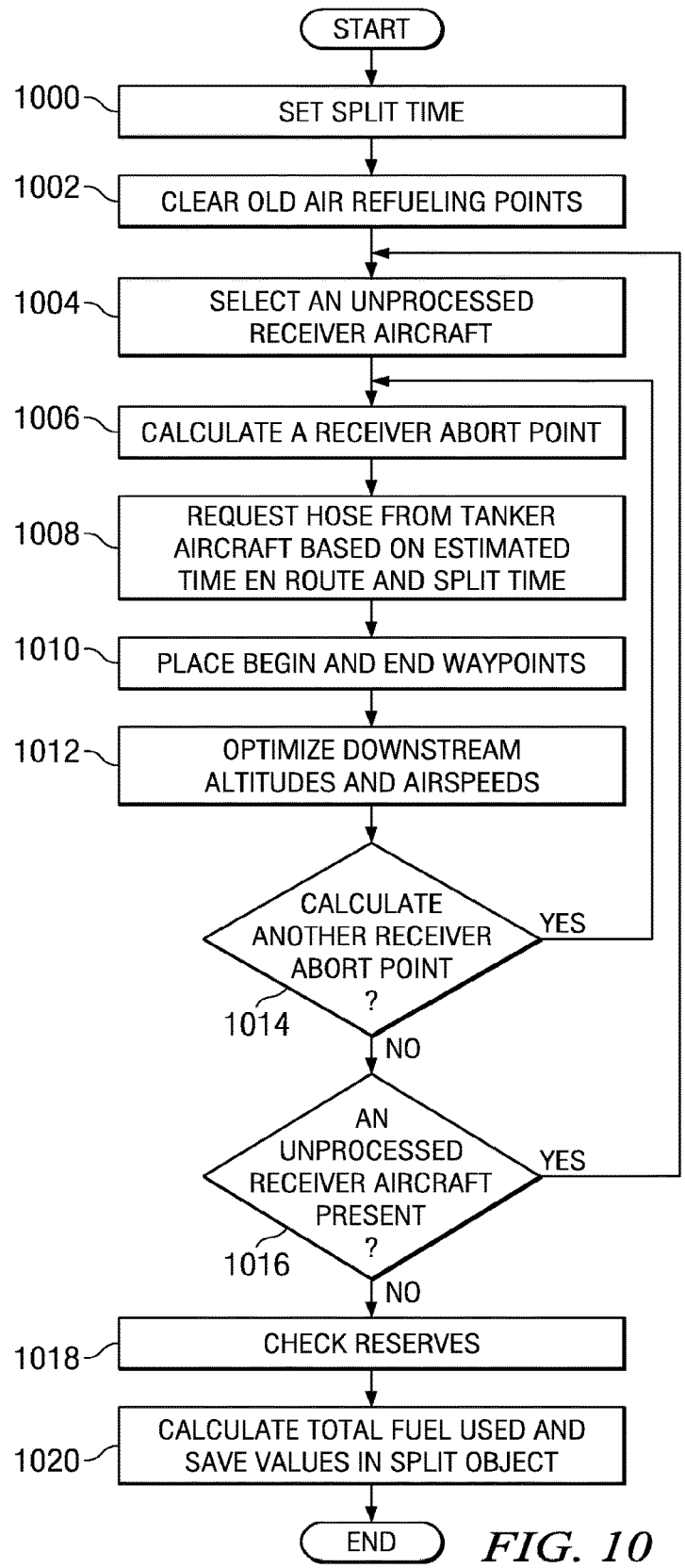
FIG. 10 is a flowchart of a process for generating an air refueling plan in accordance with an advantageous embodiment.

Turning now to FIG. 10, a flowchart of a process for generating an air refueling plan is depicted in accordance with an advantageous embodiment. The process illustrated in FIG. 10 is a more detailed description of an air refueling function that is called by operations 902, 910, and 918 in FIG. 9.

The process begins by setting a split time (operation 1000). The split time is set by extracting a split time, the tanker aircraft to be used before the split time, and the tanker aircraft to be used after the split time from the split object.

Afterwards, all old refueling points are cleared (operation 1002). An unprocessed receiver aircraft is selected from the receiver aircraft in the formation (operation 1004).

After selecting a receiver aircraft, the process calculates a receiver abort point for the selected aircraft (operation 1006). Next, the process requests a hose from a tanker aircraft based on the estimated time en route and the split time (operation 1008). Next, begin and end waypoints are placed into the formation route object for the receiver aircraft (operation 1010). In operation 1010, the begin and end waypoints are created and inserted into the formation route in the location based on the hose allocation time identified in operation 1008).

The process then optimizes the downstream altitude and airspeeds (operation 1012). In this operation, these parameters are re-optimized for the formation route downstream of the begin and end waypoints placed into the formation route in operation 1010. Thereafter, a determination is made as to whether another receiver abort point should be calculated (operation 1014). The determination in operation 1014 is made by identifying whether the end of the route has been reached. If additional receiver abort points should be calculated, the process returns to operation 1006 as described above.

In determining a receiver abort point location and a route, the process determines the point on the route in the formation for which the receiver can make it to a current airport and still meet reserve requirements. This point is identified as the receiver abort point. This point is added to the formation route at the appropriate location. Then, a divert route is constructed from this receiver abort point to the current divert airport. Fuel is calculated along this route and reserves at the divert airport are verified.

With reference again to operation 1014, if another receiver abort point is not to be calculated, this means that all of the air refueling points have been identified for the particular receiver aircraft. Then, a determination is made as to whether any additional unprocessed receiver aircraft are present (operation 1016).

If an additional unprocessed receiver aircraft is present in the formation, the process returns to operation 1004. Otherwise, the process checks reserves (operation 1018). This operation checks that all of the specified fuel amounts are met on all legs of the route including all divert route legs and receiver abort point divert route legs.

Then, the process calculates the total fuel used and saves the value in the split object (operation 1020). If the plan does not work with the calculations executed in this process, a selected high value or null value may be recorded to indicate a failure to generate an air refueling plan. The solution per the current split object is then marked as a failure and it is not considered when choosing the split object that is best; that is the least total fuel burned. In these examples, the plan generated by the process does not work if the diverts or the destination does not meet fuel reserves. For example, insufficient fuel may be present to reach the destination or to meet the divert requirements during flight.

Figure 11:
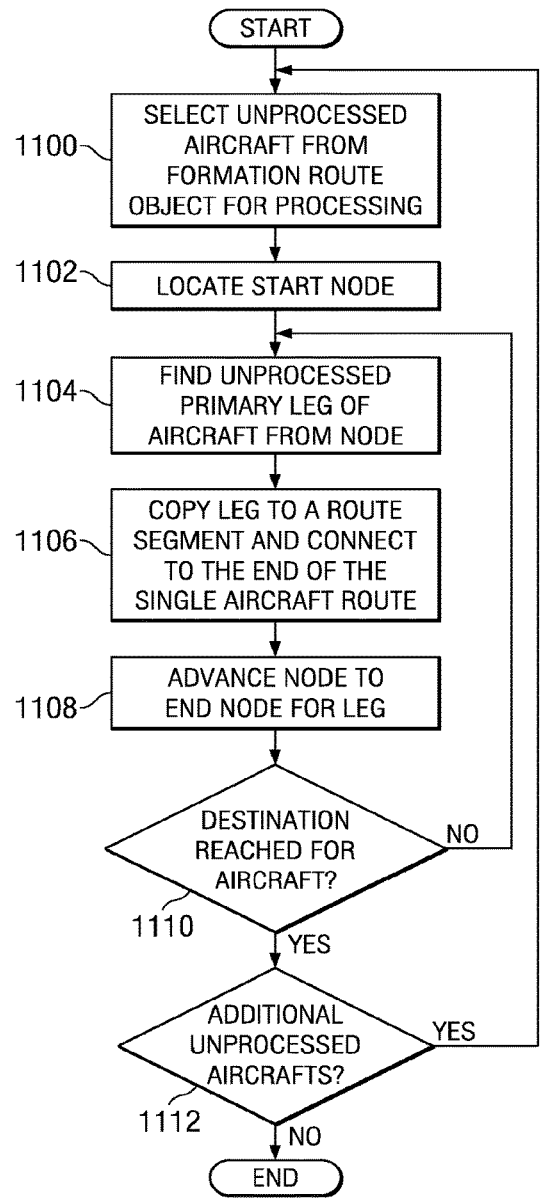
FIG. 11 is a flowchart of a process for converting the formation route object back into individual routes in accordance with an advantageous embodiment.

Turning now to FIG. 11, a flowchart of a process for converting the formation route object back into individual routes is depicted in accordance with an advantageous embodiment. The process illustrated in FIG. 11 may be implemented in a software component, such as air refueling plug-in application 320 in FIG. 3.

The process begins by selecting an unprocessed aircraft from the formation route object for processing (operation 1100). Thereafter, a start node is located for the selected aircraft (operation 1102). A primary leg of the aircraft that has not been processed is found from the node (operation 1114). A primary leg is a leg along the route of the aircraft from the departure airport to the destination. Specifically, the primary leg is not a divert route or an alternate route, or another aircraft's route out of the node.

Thereafter, the leg is copied to a route segment and connected to the end of the single aircraft route (operation 1106). Next, The node is advanced to the end node for the leg (operation 1108). Then, a determination is made as to whether the destination has been reached for the aircraft (operation 1110). If the destination has not been reached, the process returns to operation 1104. In this manner, the process walks down the route to the destination node; copying each leg along the way onto the individual route. Divert and alternate routes are ignored so the individual route is a simple linear path from the departure to the destination airport.

If the destination has been reached for the aircraft, the processing of the current aircraft has completed. Thereafter, a determination is made as to whether additional unprocessed aircraft are present in the formation route object (operation 1112). If additional unprocessed aircraft are present, the process returns to operation 1100. Otherwise, all of the aircraft have been processed and placed into individual routes and the process terminates.

Figure 12:
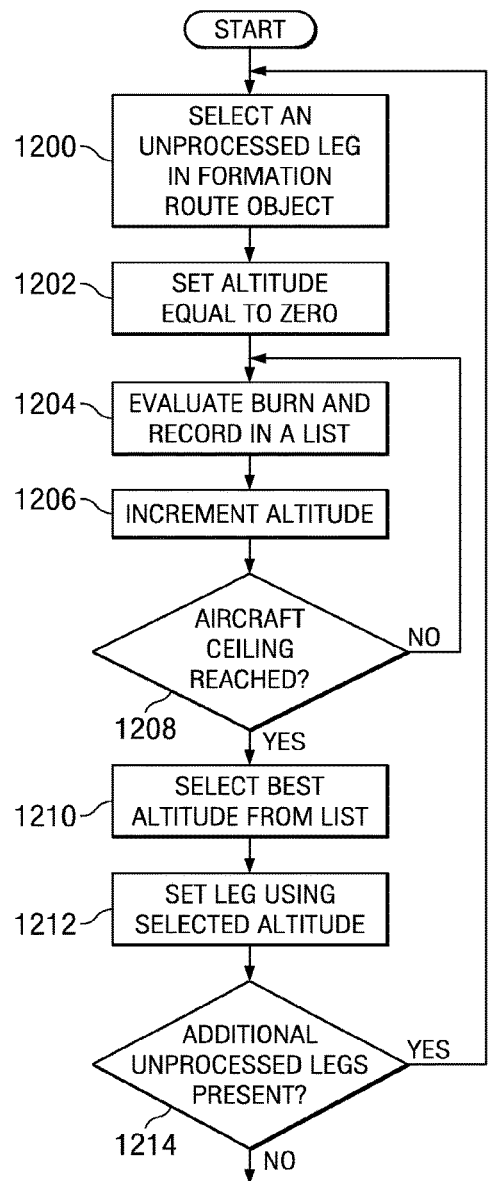
FIG. 12 is a flowchart of a process for optimizing altitude in accordance with an advantageous embodiment.

Turning now to FIG. 12, a flowchart of a process for optimizing altitude is depicted in accordance with an advantageous embodiment. In these examples, the optimization of the altitude may be performed using a software component, such as air refueling plug-in application 320 in FIG. 3. The optimizations performed in the flowchart in FIG. 12 are examples of optimizations that may be performed in operations 720 in FIG. 7, 806 in FIG. 8, and operation 1012 in FIG. 10.

The process begins by selecting an unprocessed leg in the formation route object (operation 1200). Thereafter, the altitude is set equal to zero for the selected leg (operation 1202). An evaluation of the fuel burn or usage is made and recorded in a list for this altitude (operation 1204). The altitude is incremented (operation 1206). The altitude may be incremented using different values. For example, the altitude may be incremented at one foot, ten feet, or fifty feet each time. The actual value used depends on the particular implementation.

Thereafter, a determination is made as to whether the aircraft ceiling has been reached for the aircraft (operation 1208). If the aircraft ceiling has not been reached, the process returns to operation 1204.

With reference again to operation 1208, if the aircraft ceiling has been reached, the best altitude is selected from the list (operation 1210). In these examples, the best altitude is the altitude having the best burn or fuel usage rate.

Next, the leg is set using the selected altitude (operation 1212). Then, a determination is made as to whether additional unprocessed legs are present (operation 1214). If additional unprocessed legs are present the process returns to operation 1200 to select another unprocessed leg from the formation route object. Otherwise, the process terminates.

The flowcharts illustrated above for creating air refueling plans for a formation involve a number of different operations for calculating fuel usage for individual aircraft in the formation. Other operations also are performed with respect to individual aircraft such as identifying a divert point or fuel reserves. Operations directed at individual aircraft may be performed using any desired process or calculation to identify fuel usage and hose allocation. These different functions may be implemented in different manners depending on the particular implementation.

The different advantageous embodiments combine calculations normally performed for individual aircraft into a formation in which parameters, such as fuel usage, are taken into account for the entire formation rather than the individual aircraft in the formation.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer usable program code for planning refueling of aircraft. Different embodiments include an air refueling plug-in application that is capable of calculating air refueling routes for formation of aircraft. Further, a framework is capable of providing framework services to the air refueling plug-in application. Further, this framework allows for other plug-in applications to interact with the framework and provide services to the air refueling plug-in application. The apparatus may include a first interface for the air refueling plug-in application and the other plug-in applications to receive framework services from the framework. A second interface also may be present for the air refueling plug-in application and other plug-in applications to provide services between the different plug-in applications.

Further, in different advantageous embodiments, air refueling planning may be performed using first data for receiver aircraft and second data for tanker aircraft. A refueling plan is generated for use between starting point and a destination point for the receiver aircraft using the first and second data. The method optimized is the fuel efficiency for the receiver and tanker aircraft as a group. Of course, other parameters may be optimized in place of or in addition to fuel efficiency in these examples.

In this manner, the method, apparatus, and computer usable program product in the different embodiments may be used to manage the refueling of aircraft. The flight plans generated in the different embodiments may be used to plan refueling operations for aircraft. In addition, the different embodiments may be used to dynamically manage the refueling of aircraft during a flight or mission. Also, simulations of refueling operations may be run to plan future refueling operations.

The different embodiments can take the form of an entirely hardware embodiment, an entirely software embodiment or an embodiment containing both hardware and software elements. One embodiment may be implemented in software, which includes but is not limited to firmware, resident software, microcode, or other forms.

Furthermore, the different embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system, or a propagation medium. The medium also may be physical medium or tangible medium on which computer readable program code can be stored. Examples of a computer-readable medium include a semiconductor or solid state memory, magnetic tape, a removable computer diskette, a random access memory (RAM), a read-only memory (ROM), a rigid magnetic disk, an optical disk, or some other physical storage device configured to hold computer readable program code. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the data processing system to enable the data processing system to become coupled to other data processing systems or remote printers or storage devices through intervening private or public networks. Modems, cable modem and Ethernet cards are just a few of the currently available types of network adapters.

The description of the different advantageous embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus that comprises a drawing engine and a display configured to create and display refueling routes, for a formation of aircraft that comprises a receiver aircraft, a first tanker, and a second tanker, that minimize a fuel consumption for the formation and achieve a requirement that comprises at least one of: an arrival time, or an in-flight time, for the formation, such that the apparatus comprises:
a computer that comprises:
a processor configured to receive:
weather conditions from a real-time weather feed;
first aircraft data that comprises: real-time aircraft performance sensed and transmitted from the receiver aircraft in flight, and a receiver aircraft position received from a first GPS listener; and
second aircraft data that comprises real-time aircraft performance sensed and transmitted from the first tanker in flight, and a first tanker position received from a second GPS listener;
third aircraft data that comprises real-time aircraft performance sensed and transmitted from the second tanker in flight, and a second tanker position received from a third GPS listener;
a bus connected to the processor; and
a memory that comprises instructions; and
the processor configured to:
execute the instructions to plan refueling for the receiver aircraft, such that the instructions comprise an air refueling plug-in application that comprises instructions configured to generate a refueling plan for refueling the receiver aircraft from at least a first tanker aircraft and a second tanker aircraft, such that the refueling plan comprises a split time between the first tanker aircraft and the second tanker aircraft and minimizes the fuel consumption for the formation; and
generate, for the formation, on the display: presentations of aircraft properties, the refueling routes, a generation of the formation, aircraft information for each aircraft in the formation, and air refueling events.

2. The apparatus of claim 1, wherein the split time comprises a time in which, before the split time, all air refueling requests by the receiver aircraft will be serviced by the first tanker aircraft, and in which, after the split time, all refueling requests by the receiver aircraft will be serviced by the second tanker aircraft.

3. The apparatus of claim 1, wherein the instructions further comprise:
instructions for requesting a hose from one of the first tanker aircraft and the second tanker aircraft based on an estimated time en route for the first tanker aircraft and the second tanker aircraft, and based on the split time.

4. The apparatus of claim 1, wherein the instructions further comprise:
a plurality of plug-in applications;
a framework capable of providing framework services to the air refueling plug-in application and the plurality of plug-in applications;
a first interface for the air refueling plug-in application and the plurality of plug-in applications to receive the framework services from the framework; and
a second interface for the air refueling plug-in application and plurality of plug-in applications to provide services from one plug-in application to another plug-in application, wherein the first interface and the second interface are independent of the air refueling plug-in application and plurality of plug-in applications.

5. The apparatus of claim 4, wherein the framework provides display services and wherein the first interface allows the plurality of plug-in applications to extend display services to other plug-in applications.

6. The apparatus of claim 4, wherein a location information plug-in application is present in the plurality of plug-in applications and wherein the location information plug-in application provides location information about the formation of aircraft and provides a display service to display the location information.

7. The apparatus of claim 4, wherein the plurality of plug-in applications comprises a weather information plug-in application configured to provide weather information and a display service to display the weather conditions to other plug-in applications.

8. The apparatus of claim 4, wherein the plurality of plug-in applications comprises a performance model plug-in application configured to provide information about aircraft to other plug-in applications.

9. The apparatus of claim 4, further comprising:
a set of plug-in applications, within the plurality of plug-in applications, configured to provide current data about the formation of aircraft to an air refueling plug-in while the formation of aircraft are in flight; and
the air refueling plug-in configured to modify, based upon the current data, the refueling routes for the formation of aircraft.

10. The apparatus of claim 4, wherein the apparatus further comprises:

the refueling routes further configured to comprise in real time, altitudes and airspeeds to be flown on each leg down stream on the refueling routes for each of the receiver aircraft and each tanker, such that any climb or descent on the each leg comprises a rate compatible to the receiver aircraft and each tanker; and the framework configured to execute on a data processing system.

* * * * *